US009819214B2

(12) United States Patent
Han et al.

(10) Patent No.: US 9,819,214 B2
(45) Date of Patent: Nov. 14, 2017

(54) WIRELESS CHARGER FOR MOBILE TERMINAL

(71) Applicant: LG ELECTRONICS INC., Seoul (KR)

(72) Inventors: Kiwon Han, Seoul (KR); Euntaek Jeoung, Seoul (KR); Jun Park, Seoul (KR); Buyoung Yang, Seoul (KR); Donghyun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 97 days.

(21) Appl. No.: 14/769,071

(22) PCT Filed: Apr. 2, 2014

(86) PCT No.: PCT/KR2014/002848
§ 371 (c)(1),
(2) Date: Aug. 19, 2015

(87) PCT Pub. No.: WO2015/088108
PCT Pub. Date: Jun. 18, 2015

(65) Prior Publication Data
US 2016/0020633 A1    Jan. 21, 2016

(30) Foreign Application Priority Data
Dec. 13, 2013 (KR) .................. 10-2013-0155469

(51) Int. Cl.
*H02J 7/00* (2006.01)
*H02J 7/02* (2016.01)
(Continued)

(52) U.S. Cl.
CPC .............. *H02J 7/025* (2013.01); *H02J 7/042* (2013.01); *H02J 17/00* (2013.01); *H02J 2007/0096* (2013.01); *Y02B 40/90* (2013.01)

(58) Field of Classification Search
USPC ................................ 320/104, 106, 108, 109
See application file for complete search history.

(56) References Cited

U.S. PATENT DOCUMENTS

| 2011/0062916 | A1 | 3/2011 | Farahani |
| 2011/0074344 | A1 | 3/2011 | Park et al. |

(Continued)

FOREIGN PATENT DOCUMENTS

| CN | 102630359 | 8/2012 |
| JP | 2013-115909 | 6/2013 |

(Continued)

OTHER PUBLICATIONS

PCT International Application No. PCT/KR2014/002848, Written Opinion of the International Authority dated Sep. 11, 2014, 9 pages.

(Continued)

*Primary Examiner* — Brian Ngo
(74) *Attorney, Agent, or Firm* — Lee, Hong, Degerman, Kang & Waimey

(57) ABSTRACT

Disclosed is a wireless charger for a mobile terminal, by which charging can be raised irrespective of a location of a mobile terminal mounted on the wireless charger. The present invention includes a housing, a power transmitting coil provided within the housing in a manner of being spirally wound plural times, a power supply module configured to externally supply a power to the power transmitting coil, a driving unit connected to a spiral center of the power transmitting coil, a sensing unit configured to sense a location of the mobile terminal mounted on a topside of the housing, and a control unit controlling the driving unit to shift the spiral center of the power transmitting coil to the location of the mobile terminal sensed by the sensing unit.

9 Claims, 3 Drawing Sheets

(51) Int. Cl.
*H02J 17/00* (2006.01)
*H02J 7/04* (2006.01)

(56) References Cited

U.S. PATENT DOCUMENTS

| | | | | |
|---|---|---|---|---|
| 2012/0043931 A1* | 2/2012 | Terao | ...................... | H02J 7/025 320/108 |
| 2012/0119708 A1 | 5/2012 | Toya | | |
| 2012/0169139 A1 | 7/2012 | Kudo | | |
| 2016/0072334 A1* | 3/2016 | Wu | ........................ | H02J 50/90 320/108 |

FOREIGN PATENT DOCUMENTS

| | | |
|---|---|---|
| JP | 2013-118719 | 6/2013 |
| KR | 101315976 | 10/2013 |

OTHER PUBLICATIONS

State Intellectual Property Office of the People's Republic of China Application Serial No. 201480007390.3, Office Action dated Nov. 17, 2016, 15 pages.
European Patent Office Application Serial No. 14869262.7, Search Report dated Jul. 24, 2017, 8 pages.

* cited by examiner

[Fig. 1]
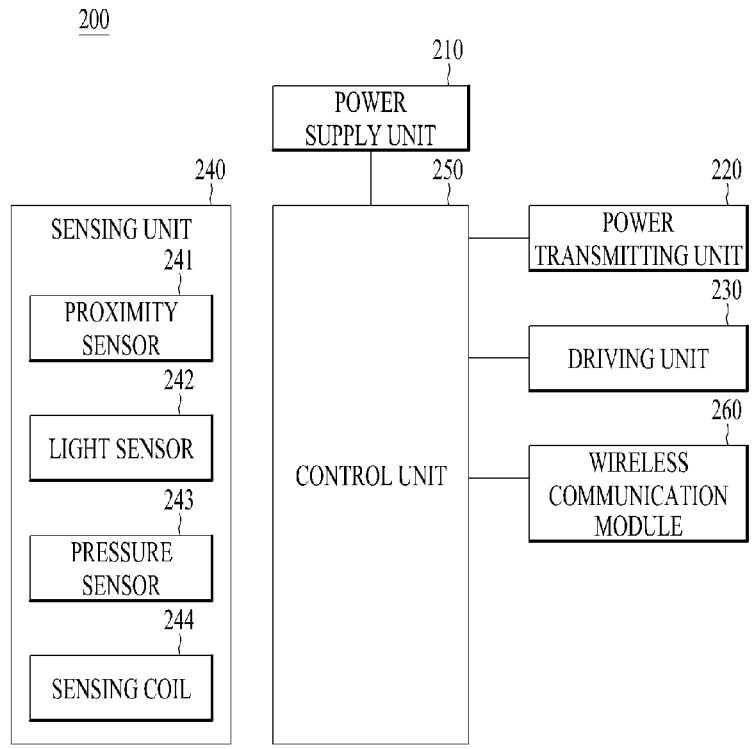
[Fig. 2]
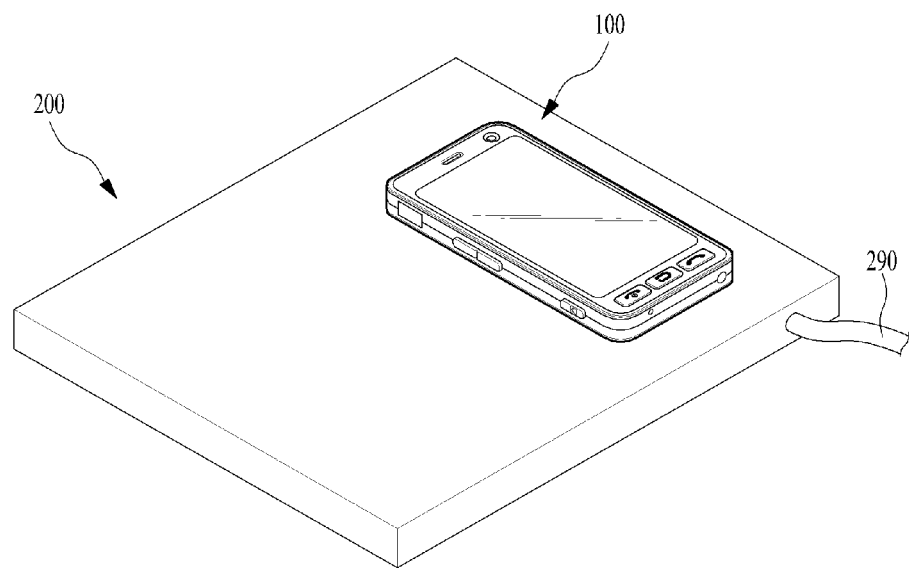

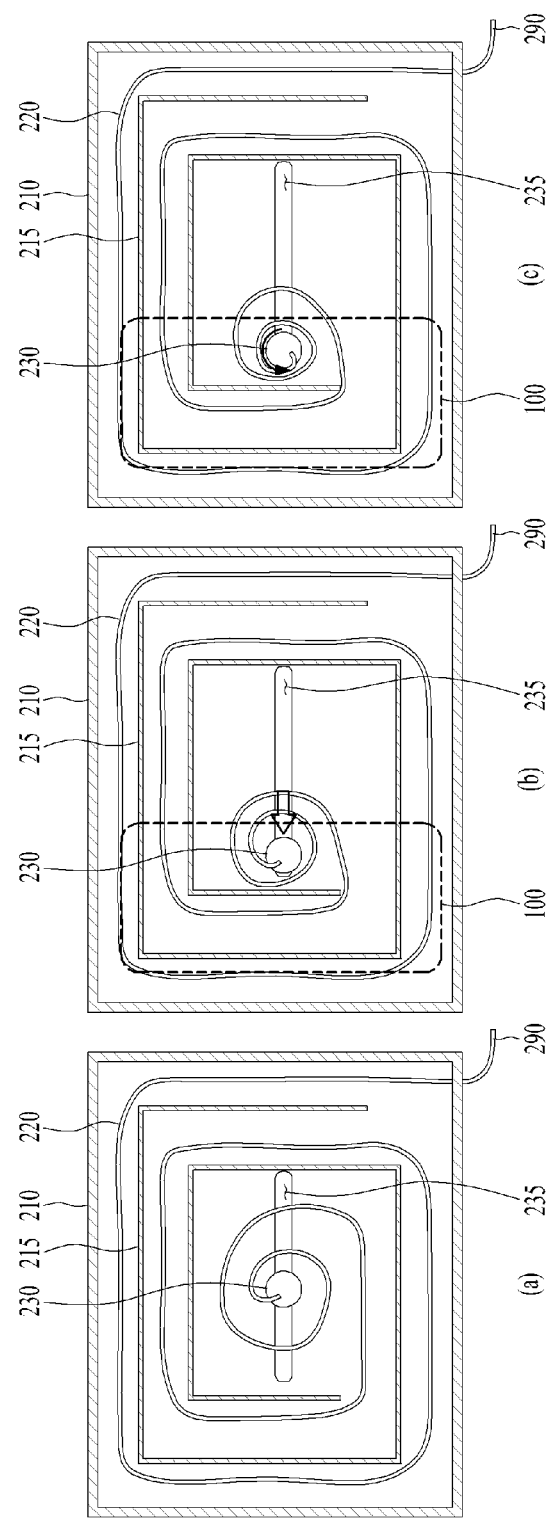

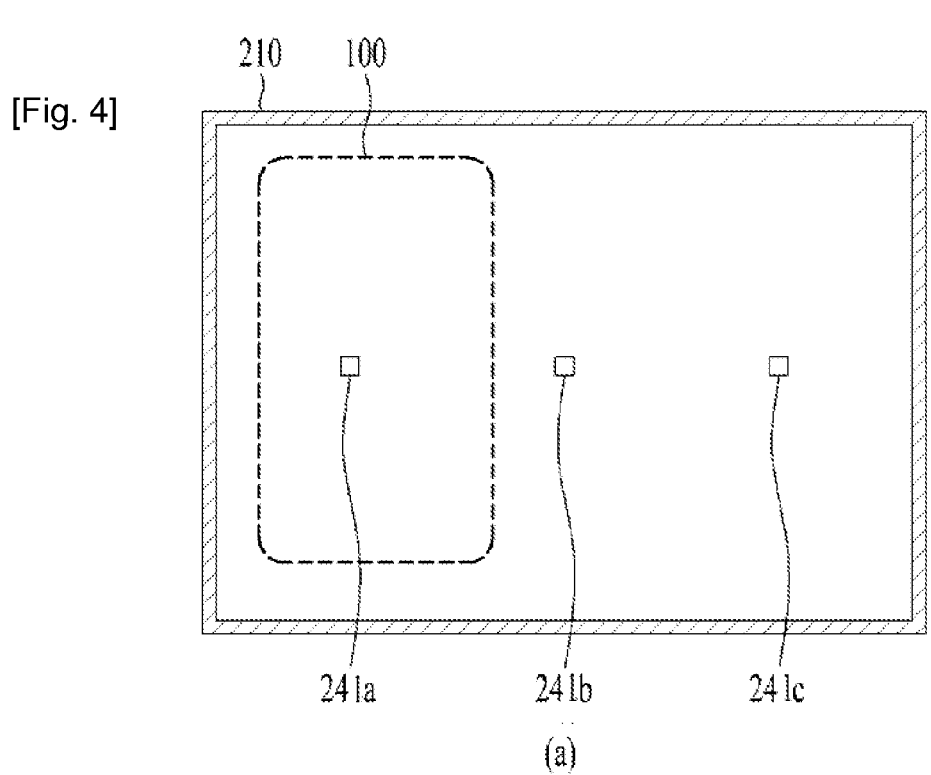
(a)
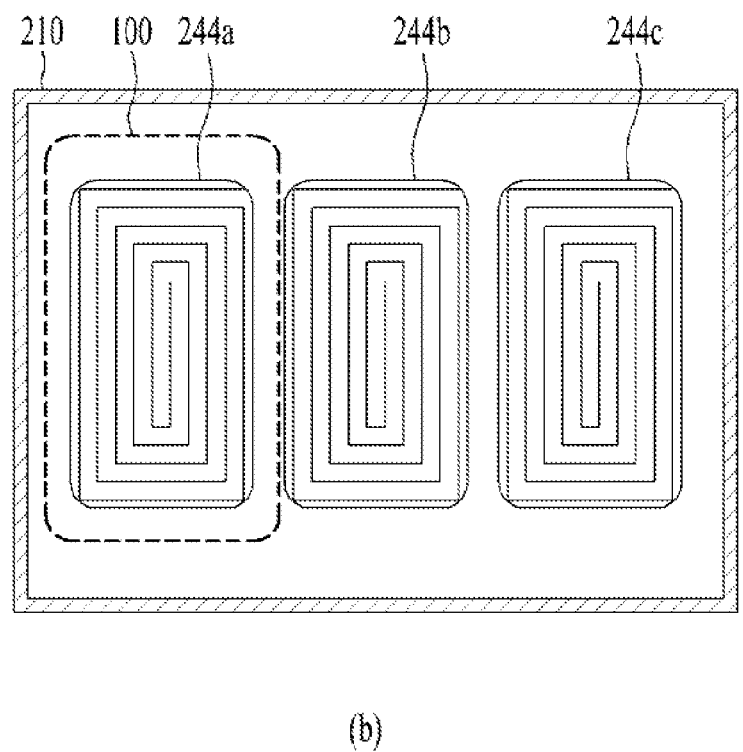
(b)
[Fig. 4]

WIRELESS CHARGER FOR MOBILE TERMINAL

CROSS-REFERENCE TO RELATED APPLICATIONS

This application is the National Stage filing under 35 U.S.C. 371 of International Application No. PCT/KR2014/002848, filed on Apr. 2, 2014, which claims the benefit of earlier filing date and right of priority to Korean Application No. 10-2013-0155469, filed on Dec. 13, 2013, the contents of which are all hereby incorporated by reference herein in their entirety.

TECHNICAL FIELD

The present invention relates to a wireless charger, and more particularly, to a wireless charger for a mobile terminal. Although the present invention is suitable for a wide scope of applications, it is particularly suitable for providing a mobile terminal with higher charging efficiency.

BACKGROUND ART

Generally, terminals can be classified into mobile terminals and stationary terminals. In addition, the mobile terminals can be further classified into handheld terminals and vehicle mount terminals.

Further, a mobile terminal can perform various functions such as data and voice communications, capturing images and video via a camera, recording audio, playing music files and outputting music via a speaker system, and displaying images and video on a display.

However, as functions of a terminal are extended, since a battery of a mobile terminal tends to be consumed fast, it is necessary to charge the battery more frequently. When there is an incoming call in the course of charging or a charging cable is connected to a mobile terminal in use, it is inconvenient for a user to use the mobile terminal. In order to use the mobile terminal without such inconvenience, the charging cable is separated from the mobile terminal and then connected to the mobile terminal again after using the mobile terminal. Thus, it is still inconvenient to use the mobile terminal.

DISCLOSURE OF INVENTION

Technical Problem

Accordingly, the present invention is directed to a wireless charger for a mobile terminal, which may substantially obviate one or more of the problems due to limitations and disadvantages of the related art.

One object of the present invention is to provide a wireless charger for a mobile terminal, by which the mobile terminal can be charged without a charging cable.

Another object of the present invention is to provide a wireless charger for a mobile terminal, by which charging efficiency can be raised.

Technical tasks obtainable from the present invention are non-limited by the above mentioned effects. And, other unmentioned technical tasks can be clearly understood from the following description by those having ordinary skill in the technical field to which the present invention pertains.

Solution to Problem

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a wireless charger for a mobile terminal according to the present invention includes a housing, a power transmitting coil provided within the housing in a manner of being spirally wound plural times, a power supply module configured to externally supply a power to the power transmitting coil, a driving unit connected to a spiral center of the power transmitting coil, a sensing unit configured to sense a location of the mobile terminal mounted on a topside of the housing, and a control unit controlling the driving unit to shift the spiral center of the power transmitting coil to the location of the mobile terminal sensed by the sensing unit.

Preferably, the driving unit may move horizontally in at least one direction.

Preferably, the driving unit may rotate to change a wound count of the power transmitting coil.

Preferably, the wireless charger may further include a short range communication module configured to communicate by wireless with the mobile terminal mounted on the housing. The control unit may receive information on a charged state of the mobile terminal. If a charging efficiency of the mobile terminal becomes equal to or smaller than a reference value, the control unit may control the driving unit to be shifted.

Preferably, the power transmitting coil may further include at least one of a switch and a variable capacitor and the control unit may adjust an impedance value depending on a variation of an inductance value of the power transmitting coil by controlling the at least one of the switch and the variable capacitor on shifting the driving unit in order for the power transmitting coil to operate at a driving frequency.

Preferably, the sensing unit may include a plurality of proximity sensors provided to the topside of the housing and the control unit may control the driving unit to be shifted to the proximity sensor sensing a close approach of an object.

Preferably, the sensing unit may include a pressure sensor provided to the topside of the housing and the control unit may control the driving unit to be shifted to a value changed part of the pressure sensor.

Preferably, the sensing unit may include a plurality of sensing coils provided to the topside of the housing and the control unit may control the driving unit to be shifted to a part at which the sensing coil having a different power consumption among a plurality of the sensing coils is located.

More preferably, an operating frequency of the sensing coil may be smaller than that of the power transmitting coils.

It is to be understood that both the foregoing general description and the following detailed description are exemplary and explanatory and are intended to provide further explanation of the invention as claimed.

Advantageous Effects of Invention

Accordingly, the present invention provides the following effects and/or features.

First of all, according to at least one of embodiments of the present invention, charging efficiency can be raised irrespective of a location of the mobile terminal mounted on a wireless charger.

Effects obtainable from the present invention are non-limited by the above mentioned effect. And, other unmentioned effects can be clearly understood from the following description by those having ordinary skill in the technical field to which the present invention pertains.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a block diagram of a wireless charger for a mobile terminal according to one embodiment of the present invention;

FIG. 2 is a perspective diagram of a wireless charger for a mobile terminal according to one embodiment of the present invention;

FIG. 3 is a diagram of a power transmitting coil inside a wireless charger for a mobile terminal according to one embodiment of the present invention; and FIG. 4 is a diagram of a sensing unit of a wireless charger for a mobile terminal according to one embodiment of the present invention.

MODE FOR THE INVENTION

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably. Moreover, in describing embodiment(s) disclosed in the present specification, if a detailed description of the related art is determined as unclearing the gist of the embodiment(s) disclosed in the present specification, the corresponding details shall be omitted. The accompanying drawings are included to facilitate a further understanding of the embodiment(s) disclosed in the present specification only. By the accompanying drawings, the technical idea disclosed in the present specification is non-limited. And, the accompanying drawings should be understood as including all modifications, equivalents and substitutes without departing from the spirit and scope of the invention.

FIG. 1 is a block diagram of a wireless charger 200 in a mobile terminal according to one embodiment of the present invention.

Referring to FIG. 1, a wireless charter 200 in a mobile terminal according to the present invention may include a power transmitting unit 220, a driving unit 230, a sensing unit 240, a control unit 250 and a power supply unit 210.

The power transmitting unit 220 is a device configured to transmit a power to a mobile terminal 100 by wireless and can use a power transmitting coil 220 wound plural times. If a current is applied to the coil, a current flows in a charging coil provided to the mobile terminal 100. Thus, a power can be transmitted by wireless.

A wireless charging technology can be classified into electromagnetic induction and magnetic resonance. In particular, the electromagnetic induction is the technology of utilizing non-radiating property and non-resonator. According to the electromagnetic induction, if a magnetic field is generated by a coil of a power transmitting unit, electricity is inducted on a coil of a receiving unit by the electromagnetic induction principle. The electromagnetic induction has been used for an electric motor, a transformer and the like. Recently, the electromagnetic induction is used for RFID of a transportation card, an electrical toothbrush charger and the like.

Since a transmitting distance of the electromagnetic induction is relatively short (e.g., several millimeters), if a charging distance increases, efficiency of the electromagnetic induction rapidly decreases despite high transmission efficiency of the electromagnetic induction. Hence, it is disadvantageous that the mobile terminal 100 should be placed at an accurate location. Moreover, since the electromagnetic induction uses low frequency (e.g., 100~250 kHz), it has limited power transmission capability.

The magnetic resonance is the technology of utilizing non-radiation property and resonator. The principle of the magnetic resonance is explained as follows. First of all, if a current is applied to the power transmitting coil 220, a magnetic field for the vibration at a resonant frequency is generated. If so, a wireless charging coil of the mobile terminal 100 resonates at the resonant frequency to have a current flow therein. Since an effective transmitting distance of the magnetic resonance amounts to several meters, the magnetic resonance has an advantage in achieving a charging in a distance longer than that of the electromagnetic induction.

An operating frequency of the magnetic resonance includes a high frequency (e.g., 6.78 MHz, etc.) by MHz unit and operates in a manner of concentrating energy on a specific frequency. Hence, it is able to transmit a considerable power at a time.

FIG. 2 is a perspective diagram of a wireless charger 200 in a mobile terminal according to one embodiment of the present invention.

Referring to FIG. 2, as a size of a wireless charger 200 in a mobile terminal 100 according to the present invention increases, the wireless charger 200 can simultaneously charge a plurality of mobile terminals 100. In particular, the wireless charger 200 of the magnetic resonance type is more convenient than the wireless charger of the electromagnetic induction type that requires the mobile terminal 100 to be placed at an accurate location for a charging.

Yet, since efficiency of the magnetic resonance varies depending on a distance, it is preferable that the power transmitting coil 220 and the mobile terminal 100 are located to raise the efficiency. To solve such a problem, the present invention is characterized in including the driving unit 230 configured to shift the power transmitting coil 220 to get closer to the mobile terminal 100 by detecting a placed location of the mobile terminal 100 using the magnetic resonance.

The driving unit 230 is coupled with a center part of the power transmitting coil 220 in a spirally wound configuration and then shifts a center of the power transmitting coil 220 in a horizontal direction, thereby raising efficiency in transmitting a power to the mobile terminal 100. Moreover, the driving unit 230 can rotate as well move in the horizontal direction. Through a rotary motion, it is able to adjust a wound count of the power transmitting coil 220. Meanwhile, the driving unit 230 shall be described in detail with reference to FIG. 3 later.

The sensing unit 240 includes a sensor configured to search for a location of the mobile terminal 100 that is mounted on a topside of the housing 210. And, the sensing unit 240 may include at least one of a proximity sensor 241, a light sensor 242, a pressure sensor 243 and a sensing coil 244.

The light sensor 242 emits a light. If the emitted light is reflected back to the light sensor 242, the light sensor 242 senses the reflected light to detect a close approach of an object. The pressure sensor 243 senses a weight of the topside of the housing 210 to detect whether the mobile terminal 100 has mounted on the topside of the housing 210. And, the sensing coil 244 can detect a location of the mobile terminal 100 by sensing a change of a power consumption amount of the sensing coil 244.

FIG. 3 is a diagram of the power transmitting coil 220 inside the wireless charger 200 in the mobile terminal according to one embodiment of the present invention, in which the housing 210, the power transmitting coil 220 and the driving unit 230 are shown.

Referring to FIG. 3, the power transmitting coil 220 is received in the housing 210. And, the mobile terminal 100 can be charged in a manner of being mounted on the topside of the housing 210. In this case, the topside of the housing 210 may be formed of a substance having a considerable friction to prevent the mobile terminal 100 from slipping thereon.

The power transmitting coil 220 is loaded within the housing 210. In particular, the power transmitting coil 220 is wound across an entire area of the housing by being spaced apart from itself. Since the magnetic resonance uses a high frequency, if a coil is intensively wound, it causes a problem that resistance increases. Hence, the coil is preferably wound 4 to 6 times.

In order to maintain a spaced distance of the coil, an interior of the housing 210 may further include a spiral partition 215 shown in FIG. 3. Yet, the partition 215 is not provided to a central part of the housing 210. And, the driving unit 230 connected to the center of the power transmitting coil 220 is located at the central part of the housing 210.

The driving unit 230 moves in right and left directions, as shown in FIG. 3, and may further move in upper and lower directions and/or diagonal direction depending on a size of the housing 210. The driving unit 230 is normally located at the center of the housing 230 so that the center of the power transmitting coil 220 is located at the center of the housing 210 [FIG. 3(a)]. If the sensing unit 240 detects that the mobile terminal 100 has mounted on one side part of the housing 210, the control unit 250 controls the driving unit 230 to move the center of the power transmitting coil 220 to the mobile terminal located spot.

Since the coil is more intensively wound on a center part of the power transmitting coil 220 than the rest, density of an electromagnetic file increases. Hence, if the central part of the power transmitting coil 220 is arranged closely adjacent to the mobile terminal 100, efficiency in transmitting a power to the charging coil of the mobile terminal 100 can be raised. In doing so, in order to raise the density of the magnetic field, the driving unit 230 rotates to increase the wound count of the power transmitting coil 220 [FIG. 3(b)].

The wireless charger 200 may further include a wireless communication module 260 configured to communicate by wireless with the mobile terminal mounted on the housing 210. As the wireless communication mobile 260 communicated with the mobile terminal 100 in a short distance, it is able to use a short range communication wireless communication device of Bluetooth, RFID (radio frequency identification) or the like.

The wireless charger 200 can receive information on a charged state of the mobile terminal 100 (e.g., a charged level, a charging efficiency, etc.) through the wireless communication module 260. Before the driving unit 230 is shifted to the mobile terminal mounted location, only if the charging efficiency is equal to or smaller than a reference value using the information, the control unit 250 controls the driving unit 230 to be shifted. If the charging efficiency is greater than the reference value, the control unit 250 may not control the driving unit 230 to be shifted.

The power transmitting coil 220 may further include a switch or a variable capacitor. Using the switch or the variable capacitor, it is able to adjust impedance of the power transmitting coil 220.

If a location and wound count of the power transmitting coil 220 are adjusted by shifting the driving unit 230, magnetic flux changes to vary inductance. Since an amount of a current flowing through the power transmitting coil 220 changes depending on the variation of the inductance, it is necessary to adjust the impedance in order to change the amount of the current flowing through the power transmitting coil 220.

Since it is able to adjust the impedance using the switch or the variable capacitor, the control unit 250 can adjust a value of the impedance depending on the variation of the inductance using the switch or the variable capacitor on shifting the driving unit 230.

FIG. 4 is a diagram of the sensing unit 240 of the wireless charger 200 in the mobile terminal 100 according to one embodiment of the present invention.

Referring to FIG. 4, as mentioned in the foregoing description, the sensing unit 240 may include at least one of the proximity sensor 241, the light sensor 242, the pressure sensor 243, the sensing coil 244 and the like.

In particular, the proximity sensor 241 emits a light (e.g., infrared ray, etc.). If the emitted light collides with an object adjacent to the proximity sensor 241 and is then reflected to the proximity sensor 241, the proximity sensor 241 detects the object adjacent thereto and then generates a corresponding signal.

Referring to FIG. 4(a), the sensing unit 240 includes a plurality of proximity sensors 241a, 241b, 241c. If a specific one of a plurality of the proximity sensors 241a, 241b, 241c detects the mobile terminal 100, the driving unit 230 can be shifted toward the specific proximity sensor 241.

The light sensor 242 is able to detect the mobile terminal mounted location by sensing a light emitted from a flash or a display unit of the mobile terminal 100. When the mobile terminal 100 is mounted on the housing 210, if a current flows through a wireless charging coil resonating with the power transmitting coil 220, it is able to control the flash and/or display unit of the mobile terminal 100 to flicker.

If the charging efficiency of the wireless charging coil becomes equal to or smaller than the reference value, it is able to control the flash and/or display unit of the mobile terminal 100 to flicker.

If the mobile terminal mounted location is detected in a manner that the light sensor 242 senses the light emitted from the flash or display unit, the control unit 250 can control the central part of the spiral power transmitting coil 220 to be shifted toward the mobile terminal 100 by shifting the driving unit 230.

Referring to FIG. 4(b), the sensing unit 240 may include the sensing coil 244. A plurality of the sensing coils 244 may be provided in a manner of being distributed onto the topside of the housing 210. When a current flows through the sensing coil 244, it the wireless charging coil of the mobile terminal 100 is situated close to the sensing coil 244, the power consumption of the sensing coil 244 increases.

The control unit 250 determines that the mobile terminal 100 is placed on the power consumption increasing sensing coil 244 and then shifts the driving unit 230 toward the power consumption increasing sensing coil 244. The current applied to the sensing coil 244 includes a pulse type current applied by predetermined periods and a power can be alternately applied to a plurality of the sensing coils 244.

In doing so, the current applied to the sensing coil 244 has a frequency (e.g., 100 KHz, etc.) lower than that of the power transmitting coil 220, thereby avoiding affecting the operation of the power transmitting coil 220.

The pressure sensor 243 is provided to the topside of the housing 210. If the mobile terminal 100 is mounted on a prescribed part of the pressure sensor 243 to pressurize, the control unit 250 determines that the mobile terminal 100 has mounted on the pressurized part and is then able to shift the driving unit 230 to the pressure sensed part.

Accordingly, the present invention provides the following effects and/or features.

First of all, according to at least one of embodiments of the present invention, charging efficiency can be raised irrespective of a location of a mobile terminal mounted on a wireless charger.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention may be applicable to various devices as well as to a mobile terminal.

The invention claimed is:

1. A wireless charger for a mobile terminal, comprising:
   a housing;
   a power transmitting coil provided within the housing in a manner of being spirally wound plural times;
   a power supply module configured to externally supply a power to the power transmitting coil;
   a driving unit connected to a spiral center of the power transmitting coil;
   a sensing unit configured to sense a location of the mobile terminal mounted on a topside of the housing; and
   a control unit controlling the driving unit to shift the spiral center of the power transmitting coil to the location of the mobile terminal sensed by the sensing unit,
   wherein the driving unit rotates to change a wound count of the power transmitting coil.

2. The wireless charger of claim 1, wherein the driving unit moves horizontally in at least one direction.

3. The wireless charger of claim 1, further comprising a short range communication module configured to communicate by wireless with the mobile terminal mounted on the housing,
   wherein the control unit receives information on a charged state of the mobile terminal and
   wherein if a charging efficiency of the mobile terminal becomes equal to or smaller than a reference value, the control unit controls the driving unit to be shifted.

4. The wireless charger of claim 1, wherein the power transmitting coil further comprises at least one of a switch and a variable capacitor,
   wherein the control unit adjusts an impedance value depending on a variation of an inductance value of the power transmitting coil by controlling the at least one of the switch and the variable capacitor on shifting the driving unit in order for the power transmitting coil to operate at a driving frequency.

5. The wireless charger of claim 1, wherein the sensing unit comprises a plurality of proximity sensors provided to the topside of the housing and wherein the control unit controls the driving unit to be shifted to the proximity sensor sensing a close approach of an object.

6. The wireless charger of claim 1, wherein the sensing unit comprises a pressure sensor provided to the topside of the housing and wherein the control unit controls the driving unit to be shifted to a value changed part of the pressure sensor.

7. The wireless charger of claim 1, wherein the sensing unit comprises a plurality of sensing coils provided to the topside of the housing,
   wherein the control unit controls the driving unit to be shifted to a part at which the sensing coil having a different power consumption among a plurality of the sensing coils is located.

8. The wireless charger of claim 7, wherein an operating frequency of the sensing coil is smaller than that of the power transmitting coils.

9. The wireless charger of claim 1, further comprising spiral partition provided between the power transmitting coil.

* * * * *